United States Patent [19]
Costin et al.

[11] Patent Number: 5,425,997
[45] Date of Patent: Jun. 20, 1995

[54] FATTY ACID MODIFIED ALKYD COATINGS WITH IMPROVED SUBSTRATE ADHESION

[75] Inventors: C. Richard Costin; Gary W. Ceska, both of West Chester; Michael A. Bailey, Boothwyn, all of Pa.

[73] Assignee: Sartomer Company, Inc., Exton, Pa.

[21] Appl. No.: 201,910

[22] Filed: Feb. 25, 1994

[51] Int. Cl.⁶ ............................................. C08L 67/08
[52] U.S. Cl. ............................ 428/482; 427/385.5; 523/514; 523/515; 525/7; 525/7.1
[58] Field of Search .................. 525/7, 7.1; 523/514, 523/515; 428/482; 427/385.5

[56] References Cited

U.S. PATENT DOCUMENTS

| | | | |
|---|---|---|---|
| 4,111,187 | 9/1978 | Aritomi | 260/22 |
| 4,147,675 | 4/1979 | Aritomi | 260/22 |
| 4,217,257 | 8/1980 | Kuzma | 260/22 |
| 4,225,473 | 9/1980 | Heiberger | 260/22 |
| 5,039,740 | 8/1991 | Anderson | 525/7 |

*Primary Examiner*—Patricia A. Short
*Attorney, Agent, or Firm*—Schnader, Harrison, Segal & Lewis

[57] ABSTRACT

Curable and cured compositions having improved substrate adhesion, a method of providing a coating composition with improved substrate adhesion, a method of adhering a coating composition to a substrate, a method of providing a substrate with an adherent cured coating or film, and substrates with coatings or films formed from a cured composition are provided, wherein the coating composition comprises a fatty acid modified alkyd resin, a metal salt of an $\alpha,\beta$-ethylenically unsaturated carboxylic acid and, optionally, an initiator and/or metal salt drying agent.

27 Claims, No Drawings

FATTY ACID MODIFIED ALKYD COATINGS WITH IMPROVED SUBSTRATE ADHESION

FIELD OF INVENTION

This invention relates to curable and cured fatty acid modified alkyd resin compositions that exhibit improved substrate adhesion. In particular, this invention relates to fatty acid modified alkyd resin compositions in which the incorporation of a metal salt of an $\alpha, \beta$-ethylenically unsaturated carboxylic acid results in improved substrate adhesion.

BACKGROUND OF THE INVENTION

Fatty acid modified alkyd resin compositions, and the processes for their preparation, are well known in the art. Generally, these compositions are obtained by the reaction of polybasic acids, polyhydric alcohols, and fatty acids. The conventional oil modified alkyd resins are utilized in the painting industry as coatings such as lacquers, enamels, coating compounds, and the like. To utilize these alkyd resins as coatings generally requires the addition of a solvent, i.e., turpentine oil, toluene, xylene, or the like, in order to achieve a viscosity suitable for application.

Fatty acid modified alkyd coatings with a high solids content are particularly useful because, by increasing the molecular weight of the resin, improved physical characteristics and a diminished drying time are achieved. However, an increase in the molecular weight results in an increase in the solvents required, which solvents are environmental pollutants and are useless once the coating film forms. The solvent requirement may be decreased by increasing the alkyd resin oil length, i.e., the weight percentage of formed triglyceride in the resin. However, increasing the oil length produces a coating in which the drying time is increased also.

U.S. Pat. No. 5,039,740 to Anderson et al. discloses a high solids fatty acid modified alkyd coating composition in which the solvent requirement is diminished yet the oil length of the alkyd does not exceed 35%. Specifically, Anderson et al. discloses a high solids fatty acid modified alkyd resin in which a portion of the solvent is replaced by vinyl unsaturated monomers or oligomers that are capable of free radical initiated addition polymerization. The resulting resins exhibit good physical and cure properties. However, the resins have been observed to exhibit poor adhesion to substrates.

The present invention is directed to fatty acid modified alkyd resins and high solids fatty acid modified alkyd resins which exhibit improved substrate adhesion.

SUMMARY OF THE INVENTION

The present invention provides curable and cured fatty acid modified and high solids fatty acid modified alkyd coating compositions, and processes for preparing and using these compositions, the compositions having improved substrate adhesion. It has been discovered that improved substrate adhesion may be achieved in these compositions by incorporating a metal salt of an acrylic or methacrylic acid into an alkyd resin.

DESCRIPTION OF THE PREFERRED EMBODIMENTS

The term "substrate", as used herein, is intended to include metal, glass, plastic, nylon, wood, and paper.

The fatty acid modified alkyd resin component of the present invention may be any of the known fatty acid modified alkyd resins and high solids fatty acid modified alkyd resins. In general, the oil length is 30–80% for the fatty acid modified resins and is 20–50% for the high solids fatty acid modified resins. These alkyd resins may be prepared from well known polybasic acids, polyhydric alcohols, and fatty acids by means of any of the known methods.

Generally, the polybasic acid, polyhydric alcohol, and fatty acid are charged together and reacted. Alternatively, the polyhydric alcohol and fatty acid are reacted to form a monoester which is then reacted with the polybasic acid. Further, the fatty acid may be derived from the oil containing the acid. In such a case, the polyhydric alcohol and oil are reacted preliminarily. Utilization of a gelation inhibitor in these processes may be desirable.

Preferably utilized as the fatty acid modified alkyd resin component in the present invention are high solids fatty acid modified alkyd resins in which a portion of solvent is replaced by vinyl unsaturated monomers or oligomers capable of free radical initiated addition polymerization. Such resins and their preparation are described in detail in U.S. Pat. No. 5,039,740 to Anderson et al. which is incorporated, in its entirety, herein by reference. The resins may be produced in accordance with the teaching of the foregoing patent in the manner described therein. The compositions and processes for manufacturing these high solids fatty acid modified polyester resins do not form a part of the present invention.

These preferred high solids fatty acid modified alkyd resins, in general, have an oil length of not greater than about 35%. The fatty acid modified alkyd is generally the reaction product of known polybasic acids, polyhydric alcohols, and fatty acids. The U.S. Pat. No. 5,039,740 patent teaches that the fatty acid component is desirably, although not necessarily, unsaturated with one or more sites of unsaturation and has a molecular weight range of about 140 to about 300.

The vinyl unsaturated monomers or oligomers utilized to replace a portion of the solvent are set forth in detail in U.S. Pat. No. 5,039,740. Briefly, suitable vinyl unsaturated monomers or oligomers are capable of free radical initiated addition polymerization and include acrylates, methacrylates, allyl-functional compounds, alpha olefins, vinyl ethers, vinyl benzenes and acrylamides, and epoxy and urethane oligomers. The monomers and oligomers preferably have a molecular weight not less than about 200. The acrylate and methacrylate monomers and oligomers are preferred.

Some illustrative acrylates and methacrylates that are set forth in the U.S. Pat. No. 5,039,740 patent include isoctyl acrylate, isobornyl acrylate, stearyl (meth)acrylate, n-lauryl acrylate, cyclohexyl acrylate, 2-ethoxyethyl (meth)acrylate, 2-phenoxyethyl (meth)acrylate, isodecyl (meth)acrylate, 1,4-butanediol di(meth)acrylate, 1,3-butanediol di(meth)acrylate, 1,6-hexanediol di(meth)acrylate, diethylene glycol diacrylate, neopentyl glycol di(meth)acrylate, ethoxylated Bisphenol A di(meth)acrylate, tripropylene glycol diacrylate and trimethylolpropane tri(meth)acrylate. Preferably, stearyl (meth)acrylate, tripropylene glycol diacrylate, ethoxylated Bisphenol A di(meth)acrylate, trimethylolpropane tri(meth)acrylate, and 1,6-hexanediol di(meth)acrylate are used.

The present invention is based on the discovery that the metal salt of an α, β-ethylenically unsaturated carboxylic acid can be advantageously employed with the above described fatty acid modified alkyd resin component to produce fatty acid modified alkyd coating compositions which exhibit improved adhesion to substrates. Preferably, the metal salt is a metal salt of an acrylic or methacrylic acid. The metal component of the acrylic or methacrylic acid metal salt may include aluminum, antimony, barium, cadmium, calcium, iron, lead, magnesium, mercury, molybdenum, nickel, potassium, silver, titanium, and zinc. Particularly preferred is zinc. The preferred metal salt is zinc diacrylate.

The metal salt may be incorporated into the alkyd resin component to achieve the coating composition of the present invention by admixing the grind component of the resin and the metal salt of the acrylic or methacrylic acid obtained by reacting the metal compound and the acid. Alternatively, the acrylic or methacrylic acid and the metal compound, i.e., metal oxide, metal hydroxide, metal carbonate, and the like, may be admixed into the grind component of the alkyd resin component and reacted in the mixture to form metal salts in situ.

The amount of metal salt to be used in the present invention should be an amount effective to yield an improvement in adhesion of the coating composition to the substrate. Generally, the amount used should be an amount from about 0.5 to about 20 percent by weight based on the weight of the coating composition. Preferably, amounts of from about 1 to about 10 percent by weight are used.

The coatings prepared from the compositions of the present invention may be prepared for application in any conventional manner by the addition of pigments, solvents, metal salt drying agents, antioxidants, dispersing aids, stabilizers, and other additives that may be desirable depending on the nature of the fatty acid modified alkyd resin component as well as the end use of the coating. Conventional free radical initiators, such as peroxides and room temperature stable azo compounds capable of thermal decomposition to produce free radicals, may be used to cure the compositions of the present invention. Useful peroxides include methyl ethyl ketone peroxide, benzoyl peroxide, and t-butyl hydroperoxide. Suitable azo compounds include 2,2-azo bis(2,4-dimethylpentanenitrile), 2,2-azo bis(2-methylbutanenitrile), and 2,2-azo bis(2-methylpropanenitrile).

The amount of free radical initiator to be used should be an amount effective to initiate polymerization of the coating composition at room temperature or on exposure to heat. Generally, from about 0.3 to about 5 weight percent of free radical initiator based on the weight of the coating composition is used. The peroxide initiators may be used alone or in combination with a metal salt drying agent, the metal salt drying agent used in an amount effective to aid in the decomposition of the peroxide initiator. Generally, the metal salt drying agent is used in an amount of from about 0.01 to about 5, preferably from about 0.02 to about 1.0, weight percent based on the weight of the coating composition. Similarly, the azo compounds may be used alone or combined with the metal salt drying agent. Preferably a peroxide initiator is used with a metal salt drying agent.

The coating compositions of the present invention may be coated on a substrate using any of the conventional coating techniques such as dipping, spraying, or roller coating. The coating compositions may be utilized as films and coatings in a variety of settings. The coating compositions of the present invention may find particular utility in those settings, i.e., automotive, industrial, or maintenance, in which adhesion of the coating to a substrate is critical.

The resulting coating composition may be formulated to dry and harden at room temperature, at temperatures up to 200° F. in a forced air oven, or by baking at temperatures above 200° F. The invention will be clarified further by a consideration of the following examples, which are intended to be purely exemplary.

EXAMPLES

In the following Table 1, all of the ingredients are expressed in parts by weight, unless otherwise noted, and each column corresponds to a numbered example Part A, the grind portion, was mixed using a high shear mechanical mixer and Part B, the letdown portion, mixed with a mechanical mixer using minimal shear. Subsequently, Part A and Part B were mixed together in equal portions. For those formulations requiring initiator, the initiator was hand-mixed into the formulation prior to application. Drawdowns of 3 mil. dry film thickness were prepared on clean aluminum test panels and the films cured under two sets of conditions, i.e., seven days at 77° F. and 30 minutes at 160° F. in a forced air oven followed by twenty four hours at 77° F. Cure time was measured as tack-free time based on thumb touch. Cross hatch adhesion was measured by ASTM D3359. Pencil gouge hardness was measured by ASTM D3364. Methyl ethyl ketone double rubs, in which a cloth saturated with methyl ethyl ketone was rubbed across the panels until the film rubbed off, were performed to measure early chemical resistance.

Example 1

A pigmented, high solids polyester alkyd coating and subsequent film were produced and tested by following the above-described procedures utilizing the formulation for Example 1, which may be found on Table 1.

Examples 2–7

Coatings and subsequent films were produced and tested for Examples 2–7 by repeating the procedures of Example 1 except that the formulations for Examples 2 through 7, which may be found on Table 1, were followed.

Example 2 involved the substitution of 19.3 parts of 1,6 hexanediol dimethacrylate for 19.3 parts of the xylenes in the grind portion and 38.0 parts of 1,6-hexanediol dimethacrylate for 38.0 weight percent of the xylenes in the letdown portion of Example 1.

Example 3 used the formulation of Example 2 except that 5.0 parts of zinc diacrylate were substituted for 5.0 parts of the zinc oxide of Example 2.

Example 4 used the formulation of Example 3 except that 5.0 parts of zinc dimethacrylate were substituted for the 5.0 parts of zinc diacrylate of Example 3.

Example 5 used the formulation of Example 2 except that 1,6-hexanediol diacrylate was substituted for the 1,6-hexanediol dimethacrylate of Example 2.

Examples 6–7

Example 6 and 7 used the formulation of Example 5 except that 5.0 parts of zinc diacrylate and 5.0 parts of zinc dimethacrylate, respectively, were added resulting in a slight increase in non-volatiles.

TABLE 1

| | EXAMPLE | | | | | | |
|---|---|---|---|---|---|---|---|
| | 1 | 2 | 3 | 4 | 5 | 6 | 7 |
| PART A (Grind Portion) | | | | | | | |
| Polyester Alkyd[1] | 50.8 | 50.8 | 50.8 | 50.8 | 50.8 | 50.8 | 50.8 |
| Zinc Oxide | 11.8 | 11.8 | 6.8 | 6.8 | 11.8 | 11.8 | 11.8 |
| Rutile Titanium Dioxide | 118.1 | 118.1 | 118.1 | 118.1 | 118.1 | 118.1 | 118.1 |
| Xylenes | 19.3 | — | — | — | — | — | — |
| HDDMA[2] | — | 19.3 | 19.3 | 19.3 | — | — | — |
| HDDA[3] | — | — | — | — | 19.3 | 19.3 | 19.3 |
| Zinc Diacrylate | — | — | 5.0 | — | — | 5.0 | — |
| Zinc Dimethacrylate | — | — | — | 5.0 | — | — | 5.0 |
| PART B (Let down portion) | | | | | | | |
| Polyester Alkyd[1] | 156.6 | 156.6 | 156.6 | 156.6 | 156.6 | 156.6 | 156.6 |
| Xylenes | 38.0 | — | — | — | — | — | — |
| HDDMA | — | 38.0 | 38.0 | 38.0 | — | — | — |
| HDDA | — | — | — | — | 38.0 | 38.0 | 38.0 |
| 6% Cobalt Naphthenate | 1.3 | 1.3 | 1.3 | 1.3 | 1.3 | 1.3 | 1.3 |
| 24% Zirconium Naphthenate | 0.6 | 0.6 | 0.6 | 0.6 | 0.6 | 0.6 | 0.6 |
| 6% Calcium Naphthenate | 1.3 | 1.3 | 1.3 | 1.3 | 1.3 | 1.3 | 1.3 |
| Anti-skinning Agent[4] | 0.4 | 0.4 | 0.4 | 0.4 | 0.4 | 0.4 | 0.4 |
| Initiator | | | | | | | |
| Methyl ethyl ketone peroxide | — | 2.0 | 2.0 | 2.0 | 2.0 | 2.0 | 2.0 |

[1] High solids soya bean modified polyester alkyd available as CHEMPOL 11-3132 ™ from Cook Composites & Polymers, Kansas City, Missouri.
[2] 1,6-hexanediol dimethacrylate available as SR-239 ™ from Sartomer Company, Inc., Exton, Pennsylvania.
[3] 1,6-hexanediol diacrylate available as SR-238 ™ from Sartomer.
[4] Methyl ethyl ketoxime available as ANTI-SKIN B ™ from Troy Chemical, Newark, New Jersey.

TABLE 2

COATING PROPERTIES
CURE CONDITIONS: 7 DAYS @ 77° F.

| | EXAMPLE | | | | | | |
|---|---|---|---|---|---|---|---|
| | 1 | 2 | 3 | 4 | 5 | 6 | 7 |
| Cross Hatch Adhesion % Loss | 0 | 50 | 8 | 0 | 80 | 10 | 20 |
| Hardness | 2H | 4H | 4H | 6H | 2H | 3H | 4H |
| MEK Resistance (Double Rubs) | 9 | 53 | 48 | 50 | 26 | 35 | 28 |

TABLE 3

COATING PROPERTIES
CURE CONDITIONS: 30 MINUTES @ 160° F.; 24 hrs. @ 77° F.

| | EXAMPLE | | | | | | |
|---|---|---|---|---|---|---|---|
| | 1 | 2 | 3 | 4 | 5 | 6 | 7 |
| Cross Hatch Adhesion % Loss | 0 | — | — | — | 60 | 20 | 40 |
| Hardness | 3H | — | — | — | 3H | 5H | 6H |
| MEK Resistance (Double Rubs) | 7 | — | — | — | 85 | 97 | >100 |

The results illustrated in Tables 2 and 3 demonstrate that, for Examples 2 and 5 in which a portion of solvent was replaced by 1,6-hexanediol dimethacrylate or 1,6-hexanediol diacrylate respectively, the cured films exhibited improved physical characteristics, but a significant loss in substrate adhesion. In contrast, in Examples 3, 4, 6, and 7 in which either 1,6-hexanediol dimethacrylate or 1,6-hexanediol diacrylate replaced a portion of the solvent and either zinc dimethacrylate or zinc diacrylate was added to the formulation, good substrate adhesion was achieved and the improvement in the films' physical characteristics was maintained.

PROSPECTIVE EXAMPLES

Example A

A high solids polyester alkyd coating is prepared by mixing Part A, the grind portion, having 50.8 parts of the polyester alkyd of Example 1, 11.8 parts zinc oxide, 118.1 parts of rutile titanium dioxide, and 19.3 parts of 1,6-hexanediol diacrylate using a high shear mixer. Part B, the letdown portion, is prepared by mixing 156.6 parts of the polyester alkyd of Example 1, 38.0 parts of 1,6-hexanediol diacrylate, 1.3 parts of 6% cobalt naphthenate, 0.6 parts of 24% zirconium naphthenate, 1.3 parts of 6% calcium naphthenate and 0.4 parts of methyl ethyl ketoxime in a mixer using minimal shear. Parts A and B are mixed together in equal portions and 2.0 parts of methyl ethyl ketone peroxide is added by hand mixing prior to application. Drawdowns of 3 mil. dry film thickness are prepared on clean glass panels and cured for seven days at 77° F. The panels are tested as described for Example 1.

Example B

A composition is prepared by repeating the procedure of Example A except that 5.0 parts of zinc diacrylate is added to the grind portion. The composition is applied to clean glass panels, cured, and tested as in Example A.

The coating composition of Example B should exhibit substrate adhesion that is superior to that of Example A.

Example C

A composition is prepared by repeating the procedure of Example A. The drawdowns of 3 mil. dry film thickness are prepared on clean untreated nylon sheeting panels and cured and tested as described in Example A.

Example D

The procedure of Example C is followed except that 5.0 parts of zinc diacrylate are added to the grind portion. The composition is applied to clean untreated nylon sheeting panels, cured, and tested as in Example C.

The coating composition of Example D should exhibit superior adhesion when compared to Example C.

Example E

A composition is prepared repeating the procedure of Example A except that a conventional polyester alkyd is substituted for the high solids polyester alkyd of Example A. Draw-downs of 3 mil. thickness are prepared on clean aluminum test panels and cured and tested as described in Example A.

Example F

A composition is prepared by repeating the procedure of Example E except that 5.0 parts of zinc diacrylate are added to the grind portion. The composition is applied to clean aluminum panels, cured, and tested as in Example E.

The coating composition of Example F should exhibit superior adhesion when compared to the composition of Example E.

Other embodiments of this invention will be apparent to those skilled in the art from a consideration of this specification or practice of the invention disclosed herein. It is intended that the specification and examples be considered as exemplary only with the true scope and spirit of the invention being indicated in the following claims.

What is claimed is:

1. A curable coating composition having improved substrate adhesion, comprising:
   (a) a fatty acid modified alkyd resin; and,
   (b) a metal salt of an α, β-ethylenically unsaturated carboxylic acid in an amount effective to improve substrate adhesion of the coating composition.

2. The composition of claim 1, wherein the metal salt of the α, β-ethylenically unsaturated carboxylic acid is a metal salt of acrylic acid.

3. The composition of claim 2, wherein the metal salt of acrylic acid is zinc diacrylate.

4. The composition of claim 1, wherein the metal salt of the α, β-ethylenically unsaturated carboxylic acid is a metal salt of methacrylic acid.

5. The composition of claim 4, wherein the metal salt of methacrylic acid is zinc dimethacrylate.

6. The composition of claim 1, wherein the metal salt of the α, β-ethylenically unsaturated carboxylic acid is present in an amount from about 0.5 to about 20 percent by weight of the coating composition.

7. The composition of claim 1, wherein the metal salt of the α, β-ethylenically unsaturated carboxylic acid is present in an amount from about 1 to about 10 percent by weight of the coating composition.

8. The composition of claim 1, further comprising a polymerization initiating effective amount of a free radical initiator.

9. The composition of claim 8, wherein the free radical initiator is present in an amount from about 0.3 to about 5 percent by weight of the coating composition.

10. The composition of claim 8, further comprising a metal salt drying agent in an amount effective to aid in the decomposition of the free radical initiator.

11. The composition of claim 10, wherein the metal salt drying agent is present in an amount from about 0.01 to about 5 percent by weight of the coating composition.

12. The composition of claim 1, wherein the metal salt of the α, β-ethylenically unsaturated carboxylic acid is formed in situ in the fatty acid modified alkyd resin from an unsaturated carboxylic acid and a suitable reactive metal compound.

13. The composition of claim 1, wherein the fatty acid modified alkyd resin is a high solids fatty acid modified resin.

14. The composition of claim 13, wherein the high solids fatty acid modified resin is a resin having a portion of solvent replaced by a vinyl unsaturated monomer or oligomer capable of free radical initiated polymerization.

15. The composition of claim 14, wherein the high solids fatty acid modified alkyd resin has an oil length of not greater than about 35 percent.

16. The composition of claim 15, wherein the metal salt of the α, β-ethylenically unsaturated carboxylic acid is a metal salt of acrylic acid.

17. The composition of claim 16, wherein the metal salt of acrylic acid is zinc diacrylate.

18. The composition of claim 15, wherein the metal salt of the α, β-ethylenically unsaturated carboxylic acid is present in an amount from about 0.5 to about 20 percent by weight of the coating composition.

19. The composition of claim 15, further comprising a polymerization initiating effective amount of a free radical initiator.

20. The composition of claim 19, further comprising a metal salt drying agent in an amount effective to aid in the decomposition of the free radical initiator.

21. The composition of claim 20, wherein the metal salt of the α, β-ethylenically unsaturated carboxylic acid is present in an amount from about 0.5 to about 20 percent by weight of the coating composition, the free radical initiator is present in an amount from about 0.3 to about 5 percent by weight of the coating composition, and the metal salt drying agent is present in an amount from about 0.01 to about 5 percent by weight of the coating composition.

22. The composition of claim 21, wherein the α, β-ethylenically unsaturated carboxylic acid is zinc diacrylate.

23. A cured composition provided by curing the compositions of claims 1, 8, 10, 13, 15, 19, 20 or 21.

24. A method for providing a fatty acid modified alkyd coating composition with improved substrate adhesion, comprising incorporating an α, β-ethylenically unsaturated carboxylic acid metal salt into a fatty acid modified alkyd resin.

25. A method for adhering a cured fatty acid modified alkyd coating composition to a substrate, comprising the steps of:
   (a) coating a substrate with a curable coating composition comprising a fatty acid modified alkyd resin and a metal salt of an α, β-ethylenically unsaturated carboxylic acid; and
   (b) curing the coating composition.

26. A method for providing a substrate having an adherent cured fatty acid modified alkyd coating or film, comprising the steps of:
   (a) coating at least one surface of the substrate with a curable coating composition comprising a fatty acid modified alkyd resin and a metal salt of an α, β-ethylenically unsaturated carboxylic acid and;
   (b) curing the coating composition.

27. A substrate having a fatty acid modified alkyd coating or film formed on at least one portion of its surfaces, the coating or film being formed from the cured composition comprising:
   (a) a fatty acid modified alkyd resin; and
   (b) a metal salt of an α, β-ethylenically unsaturated carboxylic acid.

* * * * *